June 26, 1951 W. E. RUDOLPH 2,558,060

PHONOGRAPH APPARATUS

Filed Jan. 12, 1946 3 Sheets-Sheet 1

INVENTOR.
WILLIAM E. RUDOLPH
BY HIS AGENT
Carl H. Lynnestvedt

June 26, 1951 W. E. RUDOLPH 2,558,060

PHONOGRAPH APPARATUS

Filed Jan. 12, 1946 3 Sheets-Sheet 2

INVENTOR.
WILLIAM E. RUDOLPH
BY HIS AGENT
Carl H. Lynnestvedt

INVENTOR.
WILLIAM E. RUDOLPH
BY HIS AGENT
Carl H. Synnestvedt

Patented June 26, 1951 2,558,060

UNITED STATES PATENT OFFICE 2,558,060

PHONOGRAPH APPARATUS

William E. Rudolph, Collingswood, N. J., assignor, by mesne assignments, to Philco Corporation, Philadelphia, Pa., a corporation of Pennsylvania Application January 12, 1946, Serial No. 640,901

7 Claims. (Cl. 274—10)

The present invention relates to phonographs and more particularly to phonographs of the automatic record-changer type in which a stack of records is supported above the turntable and the records are discharged individually and successively onto the turntable from the bottom of the supported stack.

Usually, in phonographs of the general type mentioned above, there is provided a cycling mechanism which, when the playing of one record is completed, automatically functions first to raise the tone-arm off the played record and to swing it clear of the record playing field, then drops a new record from the stack onto the played record, subsequently returns the raised tone-arm to starting position above the newly dropped record, and finally lowers the tone-arm to engage the pick-up stylus with the starting groove of the new record. Cycling mechanisms capable of performing the aforesaid sequence of operations, have generally been of a complicated nature utilizing intricate cam and lever systems which are distributed over and mounted onto the underside of the motor-board, with the result that assembly of the parts, as well as repair or replacement of the assembled parts, becomes a tedious and difficult procedure.

Moreover, as is customary, automatic record-changer phonographs are adapted to play records of different sizes, such as ten inch and twelve inch records. This particular adaptation of automatic phonographs introduces further complications in the cycling mechanism, which must be sufficiently flexible to provide for the necessary adjustment to accommodate and permit the proper playing of a stack of either ten or twelve inch records. The comparatively large number of parts used in known cycling mechanisms and in the means employed to allow for the adjustability of such mechanisms for the playing of records of varying sizes, as well as the particular mode of mounting these parts on the motor board, have resulted in producing heavy and cumbersome apparatus. In an effort to lighten the apparatus, rigidity has often been sacrificed for lightness of the several parts, with the result that such parts are subject to frequent distortion and breakage, causing not only inoperativeness of the apparatus but also injury to the records being used therewith.

Accordingly, it is an object of the present invention to provide an automatic record-changer phonograph having a cycling mechanism of simplified construction requiring comparatively few parts which can readily be assembled in a unitary structure suitable for attachment to the motor-board and association with the phonograph elements, such as the tone-arm and record-dispensing device, and which can likewise be readily removed, as a unit, for servicing purposes.

It is also an object of the present invention to provide an automatic record-changer phonograph with a cycling mechanism, the parts of which are of rugged construction without unduly adding weight to the apparatus, thereby obviating the possibilities of failure in the proper operation of the mechanism, while yet eliminating the objections to heavy and cumbersome apparatus.

Another object of the invention resides in the provision of an automatic phonograph cycling mechanism having a simple reciprocating cycling cam adapted to impart to the tone-arm the necessary swinging movements.

Still another and more specific object of the invention is the provision of a simplified cycling cam structure capable of being readily associated with parts of the tone-arm to actuate the same during a record-changing cycle so that said tone-arm may be positively controlled in its swinging movements, said cam structure being specially adapted to effect return of the tone-arm and location of the pick-up stylus in position to start the playing of records of varying sizes, without the use of additional stop means for that purpose.

The foregoing, together with other objects and advantages of the invention, will be clearly understood from the following description, based upon the accompanying drawings, in which.

Figure 1:
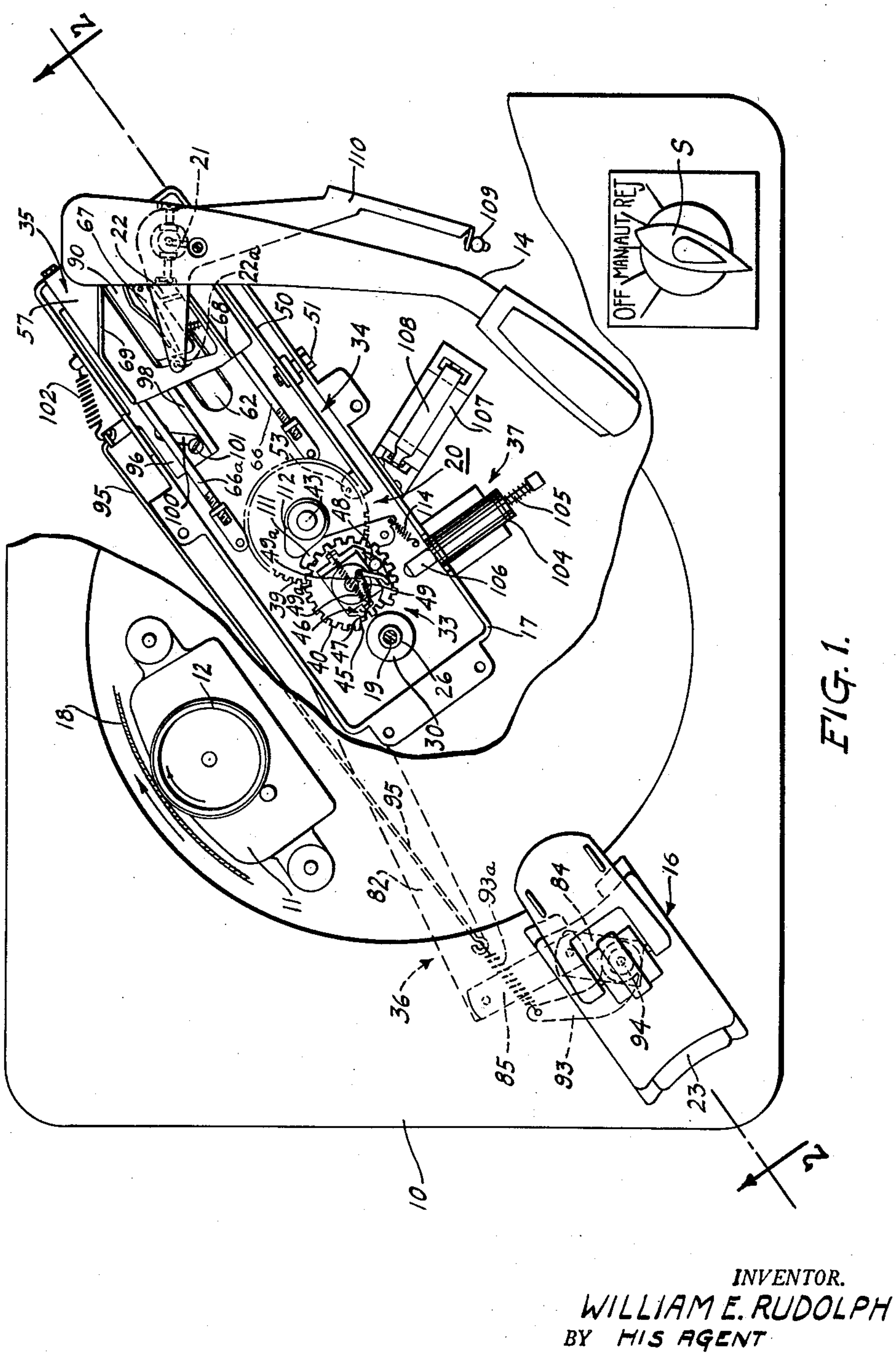
Figure 1 is a top plan view of the improved automatic record changing phonograph with certain parts removed and other parts broken away to more clearly illustrate the invention.
Figures 2, 3, 4:
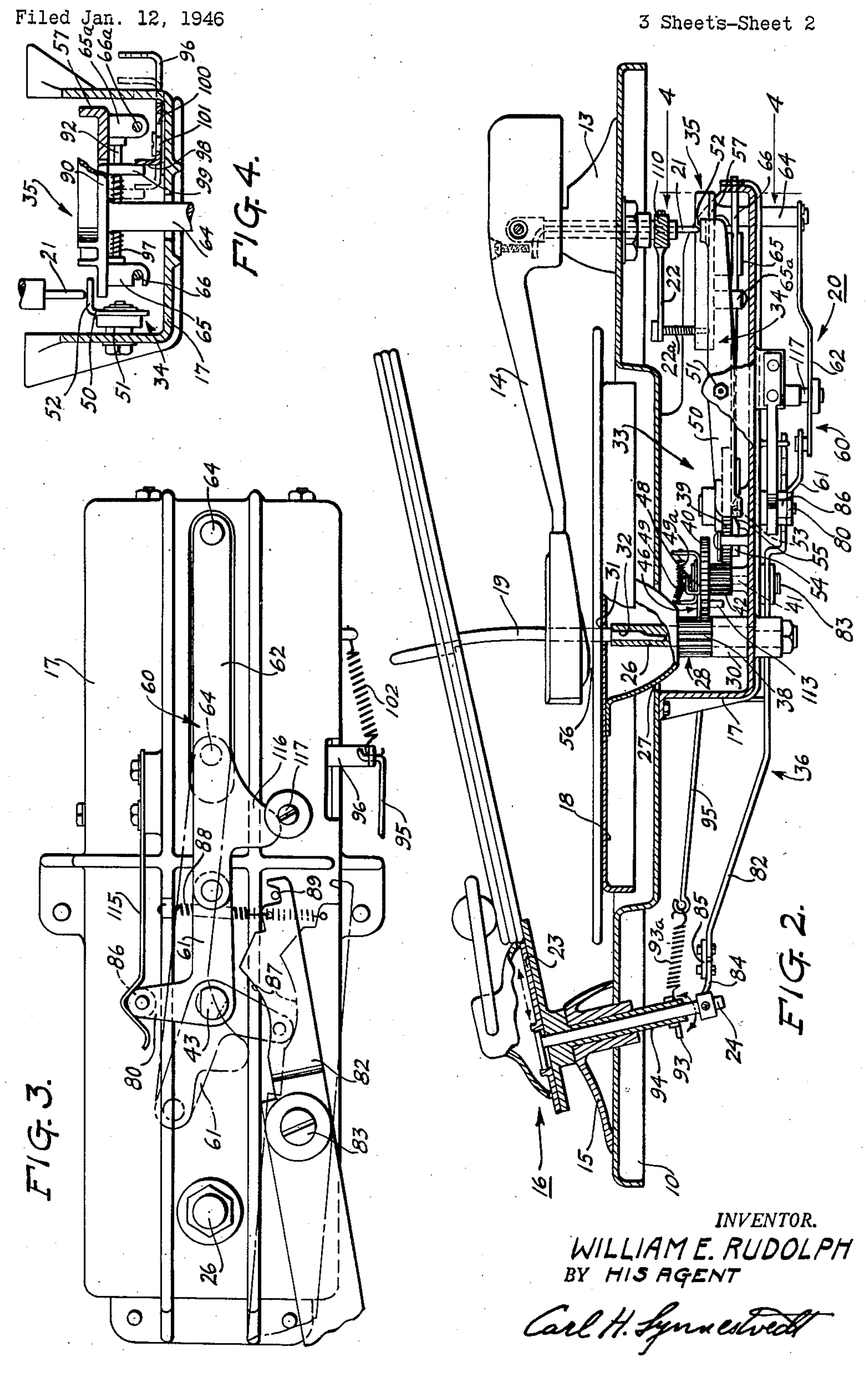
Figure 2 is a side view, partly in elevation and partly in section, looking in the general direction of arrows 2—2 of Figure 1.
Figure 3 is an enlarged view of the underside of the cycling mechanism housing with the associated parts attached thereto, and illustrating the operation of said parts.
Figure 4 is an enlarged sectional view taken substantially on line 4—4 of Figure 2.

Referring more particularly to the drawings, there is shown in Figures 1 and 2 the usual base-plate 10 which is adapted to support the phonograph operating parts. Thus, the base plate 10 carries a support 11 for the usual motor and its driven wheel 12, a support 13 for the tone-arm 14, a support 15 for the record dispensing device 16, and a bracket having the form of a housing 17 supporting turntable 18 and its associated spindle 19 as well as the improved cycling or record changing mechanism, designated in its entirety by the reference character 20.

As is customary, the motor support 11 is disposed so that the driven wheel 12 projects above the base-plate 10 for frictional engagement with the rim of the turntable 18 to impart rotary motion thereto, as represented in Figure 1. The support 13 is so connected with the tone-arm 14 that the latter is free to move both vertically and horizontally in relation to the turntable. For that purpose, the tone-arm may be associated with a vertically sliding member 21 and a horizontally swinging member 22 carrying a shifting element 22*a*, said sliding member and shifting element, in turn, being associated with parts of the improved record-changing mechanism, for actuation thereby. The support 15 carries the record-dispensing device 16 in such a manner that the latter may be adjusted and operated to dispense one record at a time from a stack of either ten inch or twelve inch records. The record-dispensing device as shown in the drawings, particularly in Figures 1 and 2, is of the known push-off type which may be manually rotated into two positions, one for ten inch records and the other for twelve inch records, and which includes a slide piece 23 automatically actuated by rotation of a cam-carrying shaft 24, in response to operation of the improved cycling mechanism.

In accordance with the present invention, the support 17 for the parts of the improved cycling mechanism, consists of a housing to which said parts are attached so that the completely assembled cycling mechanism can be secured to or removed from the base plate by connecting or disconnecting the housing to or from the underside of said plate. As is more clearly shown in Figure 2, an upright stub-shaft 26 is securely fixed to the support or housing 17 and extends upwardly through an opening 27 in the base-plate 10 for receiving and rotatably supporting the turntable 18. For that purpose, the turntable is provided with tubular extension, generally indicated at 28, which is adapted to be slipped into engagement with the shaft 26 to rotate thereabout. Spacing means such as indicated at 30, may be inserted on the lower end portion of the shaft 26 to provide a stop for abutting engagement with the extension 28 and thus maintain the turntable 18 at the proper level with respect to the upper surface of the base-plate 10. The upper extremity of the stub-shaft 26 registers with an aperture 31 located centrally of the turntable to expose a bore 32 formed axially of said stub shaft in the upper end portion thereof. Thus, the lower end portion of the spindle 19 may be removably inserted into the shaft bore 32 and rigidly held in position for cooperation with the record dispensing device 16, whereby to suspend a stack of records above the turntable in the manner known in the art and as is illustrated in Figure 2.

The cycling mechanism which, according to this invention, is carried as a unit by the housing 17, comprises a drive assembly designated generally by the reference character 33, a tone-arm lifting device 34, a tone-arm swinging device 35, an actuator 36 for the record dispensing device, and a tripping means 37 for controlling the drive assembly to initiate movement of the cycling mechanism.

The cycling mechanism drive assembly 33 is preferably constructed in accordance with the arrangement described in detail and particularly claimed in my co-pending application, Serial No. 640,900, filed January 12, 1946 (now abandoned). Basically, this drive assembly 33 includes a prime-moving gear 38, a cycling gear 39 and a master gear 40 adapted to establish or disrupt the driving connection between said prime-moving gear and said cycling gear.

In the construction illustrated, the master gear 40 is rotatably supported upon a stub-shaft 41 fixedly mounted on the housing 25, and has a pinion 42 which meshes with the cycling gear 39 so that rotation of said master gear will impart a rotary motion to said cycling gear, which is keyed or otherwise fixedly connected with a stub-shaft 43 rotatably supported in the housing 17. The master gear 40 is adapted to be driven by the prime-moving gear 38 which rotates continuously with the turntable 18. In practice, the prime-moving gear is conveniently provided by forming gear teeth on the circumferential surface of the turntable extension 28, such teeth being adapted to mesh with master gear 40. This master gear has a gap 45 (Figure 1) so that whenever this gap registers with the teeth of the prime-moving gear, said master gear remains stationary and thus disrupts the driving connection between the prime-moving and the cycling gears. Mounted on the master gear 40, is a gear segment 46 having a set of teeth adapted to engage the teeth of the prime-moving gear thereby establishing a continuous driving connection through said gear assembly. The gear segment 46 is mounted for movement either into an operative position in which the set of teeth 47 closes the gap 45 in the gear 40, or into an inoperative position in which the set of teeth 47 are withdrawn from said gap. In the arrangement as shown, a detent 48, acted upon by a spring 49, is provided to releasably lock the segment 46 in its inoperative position against the action of a spring 49*a* which normally tends to move said segment to its operative position.

While the foregoing description of the gear assembly is sufficient for the purposes of the present disclosure, reference may be had to the copending disclosure above-identified, if a more detailed description is desired.

The tone-arm lifting device 34 includes a rocking lever 50 pivoted at its intermediate portion to the housing 17, for instance, as indicated at 51. One end portion of the lever 50 carries suitable means, such as an abutment 52, adapted to contact the tone-arm lifting member 21, whereas the other end portion of said lever carries suitable means, such as pin 53, disposed for bearing engagement with a circular track 54 provided on the cycling gear 39 and having a recessed cam portion 55. As will more clearly appear from Figure 2, when the recessed cam portion 55 registers with said pin 53, the lever 50 assumes a position which permits the tone-arm 14 to be lowered, by gravity, so that the pick-up stylus 56 carried by said arm may rest in playing position upon the record on the turntable 18. Therefore, it will be understood that, as long as the recessed cam portion 55 remains in registry with the pin 53, the tone-arm and pick-up stylus remain in lowered or record playing position, but when rotation of the cycling gear 39 displaces said cam portion and causes the track 54 to ride over the pin 53, then the lever 50 assumes a position which raises the tone-arm to lift and maintain the pick-up stylus off the record on the turntable.

The tone-arm swinging device 35 includes rectilinearly reciprocating cam means, in the form of a substantially rectangular slidable plate 57 having cam elements arranged for engagement with the shifting element 22*a* of tone-arm member 22, and adapted to displace the tone-arm laterally with respect to the records, during operation of the cycling mechanism. For that purpose, there is provided a crank arrangement 60 (see Figures 2 and 3) which interconnects the rotatable shaft 43 and the cam plate 57 and functions to translate the rotary motion of said shaft into a reciprocating motion of said plate. In the construction as more clearly shown in Figure 3 of the drawings, the crank arrangement 60 consists of articulated levers 61 and 62, the lever 61 being suitably affixed to the rotatable shaft 43 for rotation therewith, and the lever 62 being pivotally attached to the cam plate 57, for instance, by means of an extension 64 rigid with said plate. Thus, as indicated in Figure 3, rotation of the shaft 43 actuates the levers 61 and 62 of the crank arrangement 60 to cause rectilinear reciprocation of the cam plate 57. The cam plate, as more clearly shown in Figures 1 and 2, is guided in its rectilinear reciprocation by means of guides 65 and 65*a* (Figure 4) conveniently provided on the plate for engagement with guide rods 66 and 66*a* suitably supported on the housing 17.

Figure 5:
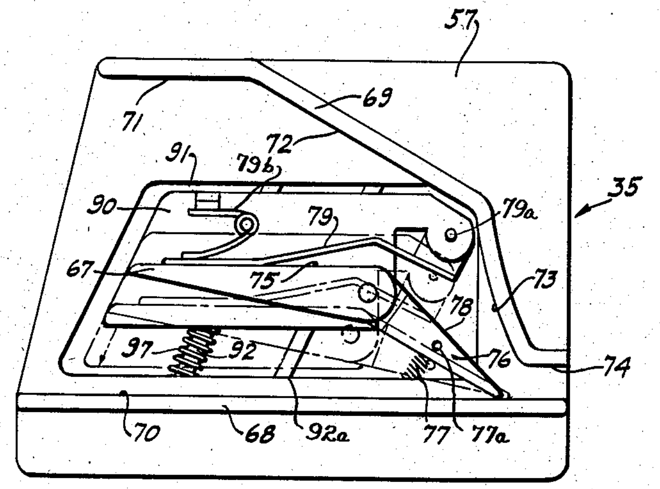
Figure 5 is an enlarged top plan view of the reciprocating cycling cam.
Figure 6:
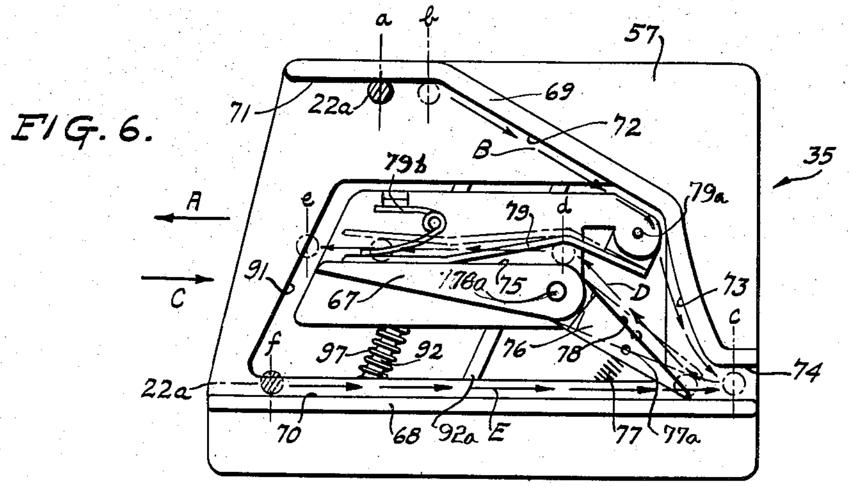
Figure 6 is a view similar to Figure 5 and diagrammatically illustrating the function of the reciprocating cam in controlling the movements of the tone-arm.

As is more readily seen in Figures 5 and 6 the cam elements on the plate 57, include an adjustably movable rail 67 and a pair of fixed rails 68 and 69 respectively disposed to face opposite sides of said adjustable rail. The fixed rail 68 has a single substantially straight cam track surface 70, whereas the fixed rail 69 has a plurality of continuous relatively angularly disposed cam track surfaces 71, 72, 73 and 74. The track surface 71 of rail 69 substantially parallels one end portion of the track surface 70 on rail 68, and the distance between these paralleling track surfaces is such that the element 22*a* may move freely while the tone-arm travels from its extreme position out side the periphery of the records to its final position when the pick-up stylus becomes located in the usual final eccentric grove in the record being played. Similarly, the track surface 74 on rail 69 parallels the other end portion of the track surface 70 on rail 68, but these latter paralleling surfaces are spaced from each only to an extent sufficient to allow free movement of the element 22*a* therebetween. The track surfaces 72 and 73 of rail 69, progress continuously, at angular relation, between track surfaces 71 and 74 in the manner particularly illustrated in Figures 5 and 6. The adjustable rail 67 is provided with a substantially straight cam track surface 75 and is further provided with a tapered pivotal guide member 76 which is mounted on a pivot 76*a*. The member 76 is biased, for example by means of a spring 77, said spring having one of its ends connected to member 76, as by passing through an opening 77*a* in said member, and having its other end suitably connected to the plate 77, so that the tapering end of said member normally bears against that end portion of the track surface 70 on the fixed rail 68 which lies adjacent the track surface 74 on the fixed rail 69. The tapered member 76 thus provides a slanting cam track surface 78 between the track surface 75 and said end portion of the track surface 70.

The operation of the cam means, as above described, to produce the necessary tone-arm swinging movements, will be best understood upon referring to Figure 6 which diagrammatically illustrates the displacement of element 22*a* during reciprocating motion of the cam plate 57. In Figure 6 it is assumed that the tone-arm has reached its final position when the pick-up stylus is in engagement with the record eccentric groove so that the initiation of a record changing cycle is about to begin. In this position, the element 22*a* has reached a position adjacent the straight cam track surface 71 substantially as shown at *a*, so that at the initiation of the record changing cycle, when rotation of the cycling gear and its shaft imparts a sliding movement to the cam plate 57 in the direction of arrow A, said surface 71 glides in contact with said element 22*a* without displacing the same and therefore without swinging the tone-arm laterally. This initial movement of the cam plate, without action on element 22*a*, is provided in order that the tone-arm lifting lever may be actuated to raise the tone-arm vertically from the record on the turntable so that, by the time the angular cam track surface 72 reaches the element 22*a*, substantially as shown at *b*, the pick-up stylus is clear of said record. Continued sliding movement of the cam plate 57 causes the angularly disposed cam track surfaces 72 and 73 to displace the element 22*a* as represented by broken arrows B in Figure 6, thereby laterally swinging the tone-arm until it reaches a position beyond the peripheral edge of the records. In this latter position the element 22*a* lies, approximately as shown at *c*, between the track surface 74 and paralleling portion of track surface 70. At this point, the cam plate 57 reverses its sliding movement, indicated by arrow C, and as the plate proceeds in this reversed direction, the slanting cam track surface 78 of the tapered member 76 causes the element 22*a* to be displaced reversely in the manner shown by broken arrows D. This reverse displacement of element 22*a* causes the tone-arm to swing laterally toward the periphery of the records until, as shown at *d*, the straight cam track surface 75 of the adjustable rail 67 reaches the element 22*a*. Surface 75 determines the position of the tone-arm to locate the pick-up stylus for engagement wtih the starting groove of the record to be played. As the straight cam track surface 75 glides along element 22*a*, this element, and therefore the tone-arm, may be effectively stabilized against lateral movement by means of a guide 79 which, as shown in Figure 6, is mounted on a pivot 79*a* and is normally urged toward rail 67 by means of a spring 79*b*. While thus stabilized, the tone-arm is lowered, as above described, to bring the pick-up stylus into engagement with the starting groove of the record to be played as soon as the final movement of the plate 57 frees the element 22*a*, when at this time the latter assumes the position substantially as shown at *e*.

Provision of the pivotal guide member 76 permits cycling of the mechanism to feed and start the playing of the first record off the suspended stack. As is common in record changers of the type to which the present invention pertains, the stack of records is manually placed in suspended position while the cycling mechanism is idle. The tone-arm is then in a position of rest outside the periphery of the record stack so that, upon subsequent manual actuation of appropriate means, such as switch S (Figure 1), to a "Reject" position, the cycling mechanism is set in operation, thereby causing the automatic dropping of the first record from the bottom of the stack, and the automatic setting of the tone-arm for the playing of said record. In the improved structure as shown in the drawings, when the tone-arm is in its position of rest, the element 22*a* lies adjacent the straight cam track surface 70 of fixed rail 68 and ahead of pivotal rail member 76, approximately as indicated at *f* in Figure 6. Thus, upon actuation of the cycling mechanism when the slide plate 57 moves in the general direction of arrow A, the straight cam track surface 70 does not affect element 22*a* which passes beneath and beyond the pivotal rail member 76 as represented by broken arrow E, and assumes its position between the paralleling portion of said track surface 70 and the track surface 74. Thereafter, during the return motion of the plate 57 in the direction of arrow C, said element is displaced by its contact with the inclined cam track surface 78 of rail member 76 to swing the tone-arm to its starting position inside the periphery of the record to be played. This effects location of the pick-up stylus in position to engage the starting groove of the record, as previously described. Similarly, if a record is "rejected" at any time during the playing thereof, the reciprocating movement of the plate 57, initiated by manual actuation of the "reject" means, will cause the cam surfaces to displace the element 22*a* and therefore re-locate the tone-arm in starting position.

In any one of the above-mentioned conditions, before the tone-arm reaches the starting position, that is during the time that the cam plate 57 starts its reverse movement in the direction of arrow C and the time that the straight cam track surface 75 of rail 67 reaches the element 22*a* (position *d*) actuator 36 for the record dispensing device 16 comes into operation to release the bottom record from the suspended stack.

As shown in the drawings the actuator for the record dispensing device 16 consists of a leverage system under control of the cycling gear 39 and associated with said record dispensing device. The leverage system includes an actuating member 80, adapted to rotate with cycling gear shaft 43, a lever 82 pivoted at 83 to the housing 17, an arm 84 rigidly affixed to the pusher-cam shaft 24 of the record dispensing device, and a link 85 interconnecting said arm 84 to the mentioned lever 82. The actuating member 80, which is preferably formed as a branch of the cycling cam actuating lever 61, carries a roller 86 adapted, upon rotation of said member, to engage a cam-shaped edge 87 on the lever 82 and thus forcibly move the latter against the action of a spring 88, which normally maintains said lever 82 against a stop 89, as illustrtaed in Figure 3. Movement of the lever 82 by operation of the roller 86, imparts a rotating motion to the pusher-cam shaft 24 through link 85 and arm 84, and, accordingly, operates the slide piece 23 of the record-discharging device 16 to release the bottom record of the suspended stack, in the usual known manner.

It is to be noted that the lever 61 of the tone-arm shifting cam-plate 57 and actuating member 80 of the actuator mechanism for the record dispensing device, are so related that the bottom record of the suspended stack is dropped into playing position while the pick-up is fully clear of the periphery of the record.

Control of the tone-arm to locate the pick-up stylus for engagement with the starting groove of either a ten inch or a twelve inch record is accomplished by adjusting the position of the movable rail 67. As may be more clearly seen in Figure 5, this movable rail 67 is capable of being slidably moved into a plurality of positions with respect to the fixed rails 68 and 69. In Figure 5, the movable rail is shown in two positions, one (the full line position) being the position in which the tone-arm is guided to start the playing of a ten inch record, and the other (the broken line position) being the position in which the tone-arm is guided to start the playing of a twelve inch record. To provide for this adjustment, the movable rail is preferably carried on a base plate 90 adapted for insertion within the boundaries of an aperture 91 cut through the cam plate 57 between the fixed rails 68 and 59. The aperture 91 is of a size substantially larger than the area of the base plate 90, so that the latter may slide freely within the limits defined by the boundaries of such aperture. In order to guide the base plate in its displacement during adjustment of the rail 67, said base plate may conveniently be supported for transverse slidable movement on fixed guide rods 92 and 92*a* carried by the cam plate 57 and arranged thereon to span the aperture 91 as shown, for example, in Figure 5.

In accordance with the invention, movement is imparted to the base plate 90 when the record dispensing device 16 is manually rotated (Figures 1 and 2) to adjust said device to accommodate the size record to be played. For that purpose an arm 93 is fixedly attached to a sleeve 94, rigid with the record dispensing device 16, so that rotation of the latter imparts a rotary motion to the sleeve which motion, in turn, imparts a shifting motion to the arm 93. This arm is connected, through a spring 93*a*, with one end of a link 95, the other end of which is connected with a slide 96 arranged within the housing 17 and in engagement with the base plate 90 of the movable rail 67. Rail 67 is normally urged toward said slide, for example, by means of a spring 97, as shown in Figure 4. As clearly appears in Figure 4, engagement between slide 96 and the movable rail-carrying plate 90 may be had by providing said slide and plate with interengageable extensions 98 and 99 respectively.

Referring again to Figure 1, the slide 96 is provided with cam slots 100 in engagement with fixed pins 101 carried by the housing, so that the slide will have a lateral component of movement while being moved longitudinally. It will be noted that, in the arrangement as shown particularly in Figure 1, a spring 102 normally acts to withdraw the slide 96 away from movable rail-carrying plate 90 but, since the spring 97 (Figures 4 and 5) constantly urges said plate towards the slide, these two elements move together and locate the movable rail 67 in the "ten inch" position whenever the slide is subjected to no other force than that of the spring 102. Therefore, the connection between the slide 96 and the record dispensing device 16 is such that, when said device is adjusted to accommodate ten inch records, the link 95 is relaxed so that the movable rail 67 automatically assumes its "ten inch" position through action of the springs 97 and 102 as above described. However, when the record dispensing device 16 is adjusted to accommodate twelve inch records, the link 95 is drawn taut to exert a pull on the slide 96, so that the cam slots 100 act to laterally displace said slide together with the base plate 90, thereby locating the movable rail 67 in its "twelve inch" position. In the construction as described, the "ten inch" and the "twelve inch" positions on the movable rail 67 may be accurately obtained by so forming the cam slots 100 that the guide pins 101 may cooperate therewith to limit the movement of the rail in either direction and thus prevent further movement of said rail when reaching either of its positions. In this manner, since the element 22a of the tone-arm swinging member 22 is under control of the mentioned rail 67, the tone-arm may be positively controlled at the end of a cycling operation, to assure the proper location of the pick-up stylus, for its engagement with the starting groove of the record to be played.

The operation of the cycling mechanism is initiated by function of the tripping means 37 which sets the gear drive assembly in motion. As illustrated in Figure 1 of the drawings, the tripping means is of the electro-mechanical type and includes a solenoid coil 104 carried by the housing 17 and adapted, upon energization, to activate a core 105. The end 106 of this core is disposed to strike the detent 48 and disengage the same from the gear segment 46, thus freeing the latter for movement to its operative position and, accordingly, establishing the driving connection between the prime-moving gear 38 and the cycling gear 39, through the master gear 40. Energization of the solenoid coil 104 takes place upon actuation of a switch 107 electrically connected in any suitable known manner with said coil and preferably carried by the housing 17. This switch 107 includes a depressible blade 108, or the like, disposed in the path of movement of a trip finger 109 pivotally carried by an extension 110 connected with the tone-arm and adapted to swing therewith.

During the playing of a record when the cycling mechanism is idle, the trip device is in the position, clearly shown in Figure 1. As the tone-arm progresses across the record during the playing thereof, the extension 110 moving with the tone-arm, brings the finger 109 in contact with the switch blade 108, but the finger, due to its pivotal connection, drags along said blade without depressing the same. However, when the pick-up stylus enters the final eccentric grooves of the record, the tone-arm, and with it the extension 110, are given their usual oscillating motion, which reverse motion causes the finger 109 to depress the switch blade. Such depression energizes the solenoid coil 104, releasing the gear segment 46 and, accordingly, initiates a record changing cycle.

The record changing cycle is terminated when the segment 46 is moved to its inoperative position and the master gear 40 returns to the position shown in Figure 1. This movement of segment 46 to inoperative position is automatic, and is accomplished by means of a resetting finger 111 adapted to be actuated by means of a cam 112 moving with the cycling gear 39. When so actuated, the finger 111 becomes located in the path of movement of an extension 113 (Figure 2) carried by the gear segment 46 so that, as the extension sweeps past said finger during rotation of gear 40, said segment is pushed back to its inoperative position and held therein by the detent 48. It is to be noted that the cam 112 is so arranged with respect to the gear assembly that the resetting of the trip occurs when the cycling operation is nearly completed and master gear 40, together with the segment 46, is in a position approximately 180° from the position shown in Figure 1. Thus the gap 45 in said gear 40 is open to terminate the cycling operation when the position shown in Figure 1 is again reached. A spring 114 is provided to act on the resetting finger 111, to constantly urge the same into bearing engagement with its associated cam 112.

As more clearly shown in Figure 3, the cycling mechanism is effectively held in its idling position by providing a spring element 115 disposed on the housing 17 and yieldably engaging the roller 86 carried by the member 80. A cam-shaped projection 116, arranged on the lever 62 and disposed to co-act with guide means 117 on the housing 17, functions to return the crank arrangement 60 to its normal inactive position.

Figure 7:
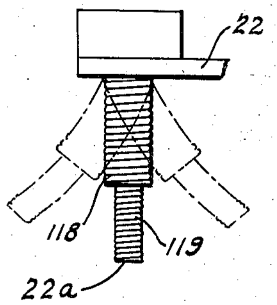
Figure 7 is a side elevational view, on a greatly enlarged scale, showing the preferred construction of one element of the mechanism.

It is pointed out that, in accordance with the present invention, provision is made to prevent breakage or jamming of parts, should the tone-arm be accidentally swung during a cycling operation. For that purpose, as more clearly shown in Figure 7, the element 22a normally in engagement with the rails of the cycling cam is of yieldable construction, preferably consisting of concentric springs 118 and 119. These impart sufficient rigidity to said element to normally cause displacement of the tone-arm by said rails, but yet allow sufficient flexibility to permit the same to give when forcibly moved against the resistance of the rails.

The switch S as shown in Figure 1 is capable of being moved into any one of the several positions indicated as "Off," "Manual," "Automatic" and "Reject." The switch is electrically connected in any suitable known manner with the motor, the tripping switch 107 and solenoid coil 104 so that: when the switch is in "Off" position, current to said motor, tripping switch and solenoid is cut off; when the switch is in "Manual" position, current is supplied to the motor alone whereby the apparatus may be used as an ordinary phonograph since the cycling mechanism is then rendered inactive; when the switch is in "Automatic" position, current is supplied to the motor and tripping switch and to the solenoid through said tripping switch whereby the cycling mechanism may then operate as previously described to automatically change records; and, when the switch is in "Reject" position, current is supplied to the motor and directly to the solenoid coil whereby a change of record may be effected at any time during operation of the apparatus. Moreover the switch S is preferably of the type which when moved to "Off," "Manual" or "Automatic" positions will remain in those positions, but when moved to "Reject" position will automatically return to "Automatic" position immediately upon being released.

From the foregoing description, it will be appreciated that the present invention makes it possible to provide a most effective cycling mechanism for automatic record changing phonograph without complicating nor unduly burdening the structure thereof. Moreover, because of the particular mode of constructing and assembling the mechanism in accordance with this invention, a defective cycling mechanism may readily be removed, as a unit, for servicing purposes or for replacement by a new unit. Particularly, the provision of the slidable cycling cam and its association with the other elements of the mechanism makes it possible to accurately control the functions of an automatic record changing phonograph to assure the proper sequence of the record changing operations. Further, the provision of the cycling cam with its adjustable rail enables the tone-arm to be controlled by a single element for playing records of varying sizes, and thus eliminates the use of a separate mechanism to arrest the tone-arm in various positions during its return toward the periphery of the record to be played. Also, the provision of the novel slidable cycling cam makes it possible to materially reduce the time necessary to effect a record changing cycle and, accordingly, considerably lessens the lapse of time between the playing of successive records. It will be apparent that the phonograph provided by this invention may also be employed in conjunction with a radio receiver, and the construction is such that the phonograph and radio may be readily enclosed in a single cabinet structure.

It is to be understood that the invention is not limited to the specific constructional embodiment shown and described, but is susceptible of various modifications within the scope of the subjoined claims.

I claim:

1. In a phonograph apparatus: a turntable; a record supporting device disposed in cooperative relationship with the turntable to discharge records onto said turntable and adjustable to accommodate records of different sizes; a tone-arm mounted in cooperative relationship with the turntable and arranged for movement away from the turntable for the unobstructed discharge of a record onto the latter, and for movement toward the turntable for engagement with the discharged record to start the playing thereof; mechanism including an element connected with the tone-arm, and a rectilinearly reciprocable cam structure provided with cam-track means disposed for engagement with said element for effecting said movement of the tone-arm away from the turntable in response to rectilinear movement of the cam structure in one direction and for effecting said movement of the tone-arm toward the turntable in response to rectilinear movement of the cam structure in the reverse direction; and means connected with the record supporting device and operatively associated with the cam structure for changing the contour of its cam-track means through adjustment of said device, whereby to vary the extent of the tone-arm movement toward the turntable in accordance with the adjustment of said device.

2. In a phonograph apparatus: a turntable; a record supporting device disposed in cooperative relationship with the turntable to discharge records onto said turntable and adjustable to accommodate records of different sizes; a tone-arm mounted in cooperative relationship with the turntable and arranged for movement away from the turntable for the unobstructed discharge of a record onto the latter and for movement toward the turntable for engagement with the discharged record to start the playing thereof; mechanism including means connected with the tone-arm, and a slidable cam structure provided with a cam track surface disposed to engage said means for effecting movement of the tone-arm for a predetermined distance away from the turntable, and with a cam track surface disposed to engage said means for effecting movement of the tone-arm for a predetermined distance toward the turntable; and means connected with the record supporting device and operatively associated with the last mentioned cam track surface for changing the contour thereof through adjustment of said device, whereby to vary the extent of the tone-arm movement toward the turntable in accordance with the adjustment of said device.

3. In a phonograph apparatus: a turntable; a record supporting device disposed in cooperative relationship with the turntable to discharge records onto said turntable and adjustable to accommodate records of different sizes; a tone-arm disposed in cooperative relationship with the turntable and arranged for movement away from the turntable for the unobstructed discharge of a record onto the latter, and for movement toward the turntable for engagement with the discharged record to start the playing thereof; mechanism including means connected with the tone-arm, and a rectilinearly reciprocable cam structure provided with a cam track surface disposed to engage said means for effecting movement of the tone-arm for a predetermined distance away from the turntable in response to rectilinear reciprocable movement of the cam structure in one direction, and with a cam track surface disposed to engage said means for effective movement of the tone-arm for a predetermined distance toward the turntable in response to rectilinear reciprocating movement of the cam structure in the reverse direction; and means connected with the record supporting device and operatively associated with the last mentioned cam track surface for changing the contour thereof through adjustment of said device, whereby to vary the extent of the tone-arm movement toward the turntable in accordance with the adjustment of said device.

4. In a phonograph apparatus, a turntable having a record supporting device disposed in cooperative relationship with the turntable to discharge records onto said turntable and adjustable to accommodate records of different sizes, a tone-arm mounted in cooperative relationship with the turntable and arranged for movement away from the turntable for the unobstructed discharge of a record onto the latter and for movement toward the turntable for engagement with the discharged record to start the playing thereof, an element connected with the tone-arm to swing therewith, a movement transmitting member supported adjacent said element and movable in two different directions, a cam rail disposed on said member to engage said element and configured to move the latter so as to swing the tone-arm away from the turntable in response to movement of said member in one direction, a second cam rail disposed on said member to engage said element and configured to move the latter so as to swing the tone-arm toward the turntable in response to movement of said member in the other direction, and means interconnecting the record supporting device with said second cam rail to adjust the position of the latter on said member through adjustment of said device to determine the extent of the tone-arm movement toward the turntable in accordance with the adjustment of said device.

5. In a phonograph apparatus, a turntable having a record supporting device disposed in cooperative relationship with the turntable to discharge records onto said turntable and adjustable to accommodate records of different sizes, a tone-arm mounted in cooperative relationship with the turntable and arranged for movement away from the turntable for the unobstructed discharge of a record onto the latter and for movement toward the turntable for engagement with the discharged record to start the playing thereof, an element connected with the tone-arm to swing therewith, a rectilinearly reciprocable plate provided with a fixed cam rail and with an adjustable cam rail, the fixed cam rail being disposed on said plate to engage said element and configured to move the latter so as to swing the tone-arm for a predetermined fixed distance away from the turntable in response to movement of said plate in one direction, the adjustable cam rail being disposed on said plate to engage said element and configured to move the latter so as to swing the tone-arm for a predetermined variable distance toward the turntable in response to movement of said plate in the reverse direction, and means interconnecting the record supporting device with the adjustable cam rail to adjust the position of the latter on said plate through adjustment of said device to determine the extent of the tone-arm movement toward the turntable in accordance with the adjustment of said device.

6. In a phonograph apparatus, a turntable having a record-supporting surface, a tone-arm mounted in cooperative relationship with the turntable and arranged to swing toward and away from the turntable in a plane substantially paralleling the plane of said turntable surface, an element connected with the tone-arm to swing therewith, a movement transmitting member supported adjacent said element and movable in two different directions, a cam rail disposed on said member to engage said element and configured to move the latter so as to swing the tone-arm away from the turntable in response to movement of said member in one direction, a second cam rail disposed on said member to engage said element and configured to move the latter so as to swing the tone-arm toward the turntable in response to movement of said member in the other direction, and means for selectively adjusting said second cam rail in various positions on said member and thus determining the extent of the tone-arm movement toward the turntable.

7. In a phonograph apparatus, a turntable having a record supporting surface, a tone-arm mounted in cooperative relationship with the turntable and arranged to swing toward and away from the turntable in a plane substantially paralleling the plane of said turntable surface, an element connected with the tone-arm to swing therewith, a rectilinearly reciprocable plate provided with a pair of cam rails, one cam rail being fixedly mounted on said plate to engage said element and configured to move the latter so as to swing the tone-arm for a predetermined fixed distance away from the turntable in response to movement of said plate in one direction, and the other cam rail being adjustably mounted on said plate to engage said element and configured to move the latter so as to swing the tone-arm for a predetermined variable distance toward the turntable in response to movement of said plate in the reverse direction.

WILLIAM E. RUDOLPH.

REFERENCES CITED

The following references are of record in the file of this patent:

UNITED STATES PATENTS

| Number | Name | Date |
|---|---|---|
| 2,005,583 | Mallina | June 18, 1935 |
| 2,233,915 | Conrad | Mar. 4, 1941 |
| 2,286,490 | Knox | June 16, 1942 |
| 2,287,098 | Habegger | June 23, 1942 |
| 2,332,650 | Knox et al. | Oct. 26, 1943 |
| 2,396,094 | Gay | Mar. 5, 1946 |

FOREIGN PATENTS

| Number | Country | Date |
|---|---|---|
| 498,030 | Great Britain | Dec. 28, 1930 |
| 822,026 | France | Sept. 6, 1937 |